(No Model.)
J. F. POPE.
WHEEL BEARING.
No. 581,918. Patented May 4, 1897.
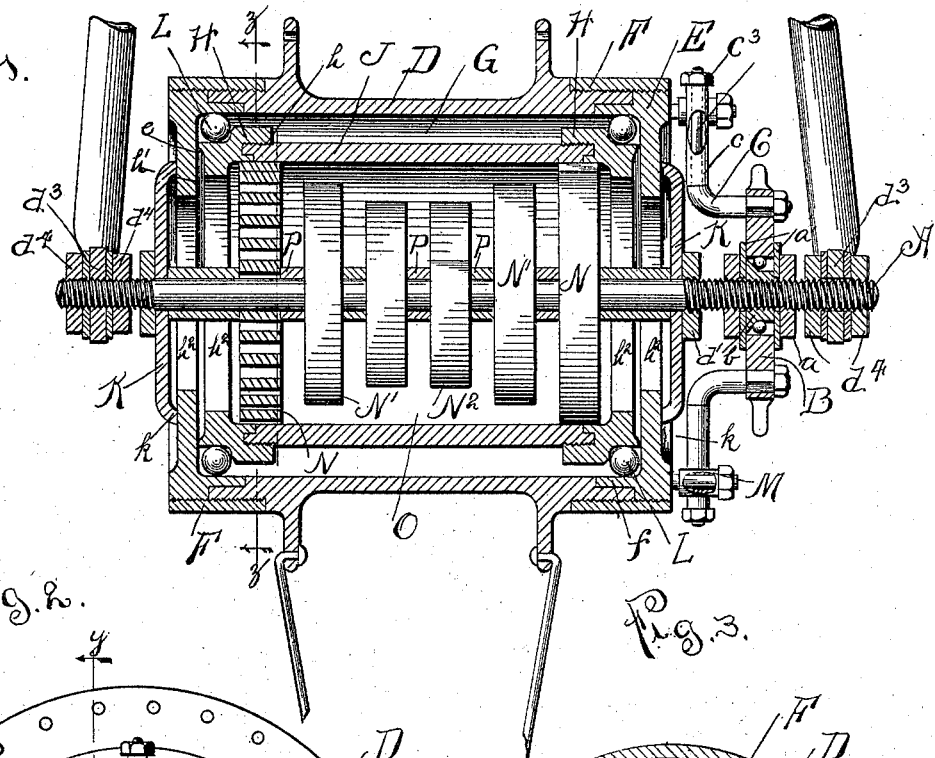
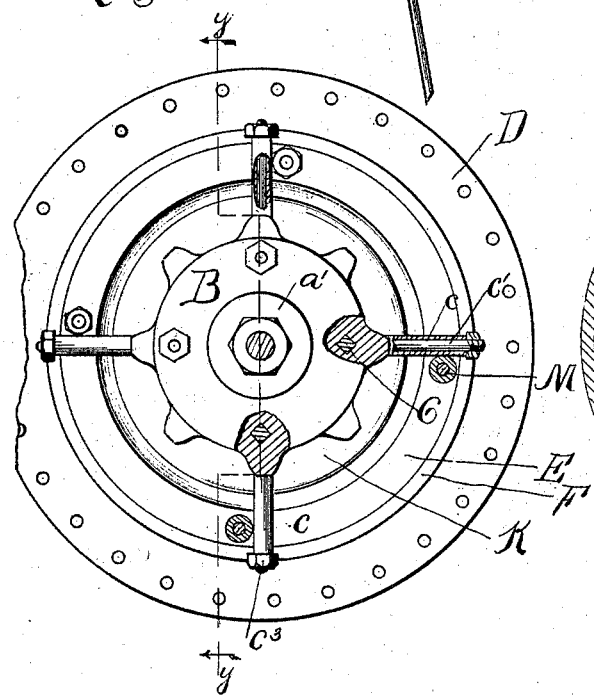
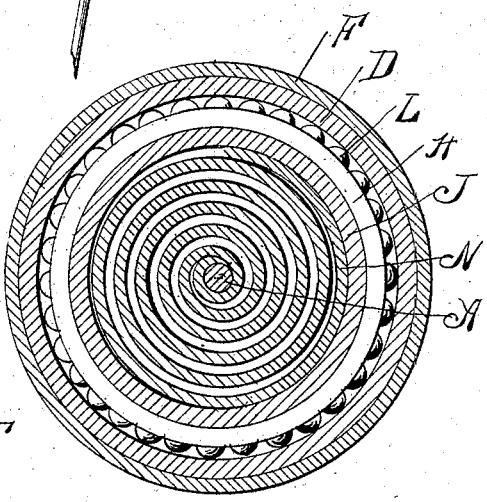
Witnesses:
J. B. Keir
L. M. Bulkley
Inventor
John F. Pope
By Chas. E. Bulkley
Atty

UNITED STATES PATENT OFFICE.

JOHN F. POPE, OF CHICAGO, ILLINOIS.

WHEEL-BEARING.

SPECIFICATION forming part of Letters Patent No. 581,918, dated May 4, 1897.

Application filed February 13, 1897. Serial No. 623,272. (No model.)

*To all whom it may concern:*

Be it known that I, JOHN F. POPE, a citizen of the United States, residing at Chicago, in the county of Cook and State of Illinois, have invented a certain new and useful Improvement in Wheel-Bearings, of which the following is a specification.

My invention relates to that class of wheeled conveyances in which it is necessary for the comfort of the rider to convert the jolting or concussion due to passing over uneven ground into the more comfortable resilient motion effected by springs or otherwise. This is now commonly effected, especially in bicycles, by a pneumatic tire, which, however, has the disadvantage of being very liable to puncture or fracture; and it is the intention and object of my invention of my improved wheel to remove this liability to such accidents by having the necessary resilient motion not located at the circumference or tire of the wheel, but instead in spiral springs located on the axle of the wheel, thereby permitting a more solid tire, which in this my invention would consist of fellies bound round with a metallic band or tire purposely roughened on its outer surface to reduce the tendency to sliding when the vehicle is sharply turned while in motion.

A further object is to provide means whereby when a pressure is exerted upon the axle, as the pressure on the wheel, and consequent jolting to the rider increases, especially on rough ground, this increasing concussion may be more evenly and gradually taken up by bringing into use the further resilient action of extra spiral springs held in reserve for this purpose around the axle of the wheel.

Having set forth the objects, I will now describe the construction of the mechanism by which I attain these objects.

Reference being now had to the accompanying drawings, Figure 1 is a vertical section through the rear-wheel hub of a bicycle or other like vehicle on line $y\ y$ of Fig. 2. Fig. 2 is an end elevation of the same. Fig. 3 is a cross-section on the line $z\ z$ of Fig. 1.

A represents the axle and is rigidly held from rotation by being secured to the frame extensions $d^3$ by the jam-nuts $d^4$. Secured to the axle A is a ball-bearing ring on which the balls $b'$ have a slight lateral movement. The sprocket B revolves on these balls.

Secured to the axle A by the jam-nuts $a$ and in contact with the ring $b$ are the guide-plates $a'$ of the sprocket-wheel B, of a sufficient diameter to form a guideway for the sprocket B.

Rigidly fixed to the sprocket B are the motion-imparting arms C, which have at their upper ends cylindrical pulleys $c$, carried upon the spindle $c'$ of the arm C and secured thereon by the nuts $c^3$. When a rotary force is applied to the sprocket B, the motion is imparted to the wheel-hub D by the arms C engaging the projections M of the plate E. The plate E is screw-threaded at its outer circumference and rigidly fixed to the wheel-hub D by the clamping screw-threaded band F and the projecting lip $f$. The hub has a circular projecting rim to receive and retain the wire spokes.

The hub of the wheel consists of the cylinder D and the end plates E, held together, as mentioned, by the screw-threaded band F. The hub revolves on balls L, located at the ends of the spring-case J H. The end plates E of the hub have a central opening of sufficient diameter to permit the movement of the hub toward the axle equal to the resilient motion of the spiral springs N N' N², located in the spring-case J H. The spring-case consists of a cylinder J and end plates H, held together by a screw-threaded device at their ends. The end plates H of the spring-case have also a central opening to permit them to have a movement toward the axle, as mentioned for the hub. At the ends of the spring-case near the junction of the cylinder J and plate H is the receptacle in which the balls L, on which the hub-case revolves, are located. In this spring-case J H are located the spiral springs N N' N², which may be as many in number as required. These spiral springs are located on the axle A and are kept apart by the collars P. Hereinafter when the "hub" is referred to the term includes the cylinder D and end plates E, the screw-threaded band F, and the projecting arm M, all connected together to form one frame. The term "spring-case" includes the cylinder J and the end plates H, with the ball-bearing receptacle, all connected together to form one frame. These two frames, the hub-case, and spring-case, with the balls L placed in their receptacle, when fitted together, the spring-case inside the hub-case, form a combination-frame, the hub-case revolving on the balls around but free from the spring-case and the combination-frame free to move toward the non-rotary axle A on the compression of the spiral springs inside the spring-case.

Loosely mounted on the shaft A are the dust-protecting plates K, their projecting lips $k$ held in contact with the plates E by the jam-nuts $d'$ and adapted, when a pressure is exerted upon the axle A, to move with the axle and to be of sufficient diameter to protect the chambers G and O from dust when the pressure on the axle has compressed the springs N, N', and $N^2$ in the chamber O.

Loosely fixed on the axle A and separated from one another by the collars P are the spiral compression-springs N, N', and $N^2$.

When a downward pressure is exerted upon the axle A, the springs N, being of a size large enough to engage the cylinder J, become compressed on the lower side between the cylinder J and the axle A. In the further downward movement of the axle and as the springs N become more compressed the springs N' engage the cylinder J, and in a still further downward movement the springs $N^2$ engage the cylinder. As the pressure becomes greater, reducing the distance at the bottom between the axle A and the cylinder, the reserve springs N' $N^2$ gradually engage the lower inner surface of the cylinder J, and the jolting that would otherwise inconvenience the rider is converted by the resilient action of the spiral springs into a more comfortable motion.

To allow a vertical motion of the axle in the chamber O, I have provided the plate E and cone H with annular openings $h^2$ of a size large enough to allow a sufficient compression of the springs.

Having thus described my invention, what I claim as new therein, and desire to secure by Letters Patent, is—

1. In a wheel-bearing the combination with the shaft thereof of a series of springs mounted side by side on said shaft, an inner stationary spring-casing, an outer revoluble casing and antifriction devices between the two said casings.

2. In a wheel-bearing the combination with the shaft thereof, of springs, convolute in form, mounted upon said shaft, a spring-casing and means for holding the same in position, certain of said springs being normally brought into action under certain vibrations and the others constituting reserve springs which are brought into action under greater vibration.

3. In a wheel-bearing the combination with the shaft and driving-wheel mounted thereon of a stationary inner spring-casing, spiral springs within said casing mounted upon the shaft and an outer revoluble casing together with loose connections between the driving-wheel and the outer casing.

4. In a wheel-bearing the combination with the shaft and driving-wheel mounted thereon of an inner casing mounted upon the shaft, convolute springs within said casing mounted upon the shaft, certain of said springs bearing upon the casing and the others of a less diameter than the casing together with an outer revoluble casing and loose connections between the driving-wheel and the outer casing.

5. In a wheel-bearing, the combination with the shaft of an inner stationary spring-casing, springs mounted upon the shaft some of which bear upon the casing and the others of a less diameter than said casing and an outer casing revoluble about the shaft together with antifriction devices between the outer casing and the inner casing.

6. The combination in a wheel-bearing of a shaft a driving-wheel mounted thereon, an outer casing, an inner casing and springs within the inner casing together with loose connections between the driving-wheel and the outer casing consisting of lugs extended from the outer casing and antifriction devices on the driving-wheel engaging said studs whereby to permit vibrational movements of the outer casing.

7. In a wheel-bearing the combination with the shaft of pressure-receiving springs mounted thereon, an inner stationary spring-casing, an outer revoluble casing, said two casings having side openings to permit vertical vibrational movement and antifriction devices between the two casings.

In testimony whereof I affix my signature in presence of two witnesses.

JOHN F. POPE.

Witnesses:
KATE S. HOLMES,
L. W. BULKLEY.